United States Patent [19]

Kermisch

[11] Patent Number: 4,545,069

[45] Date of Patent: Oct. 1, 1985

[54] ROTATION OF DIGITAL IMAGES

[75] Inventor: Dorian Kermisch, Penfield, N.Y.

[73] Assignee: Xerox Corporation, Stamford, Conn.

[21] Appl. No.: 547,199

[22] Filed: Oct. 31, 1983

[51] Int. Cl.$^4$ .............................................. G06K 9/36
[52] U.S. Cl. ...................................... 382/46; 340/727
[58] Field of Search ................. 382/46; 364/731, 725; 340/727; 358/22, 181

[56] References Cited

U.S. PATENT DOCUMENTS

| | | | |
|---|---|---|---|
| 3,811,110 | 5/1974 | Inose et al. | 382/46 |
| 4,000,486 | 12/1976 | Schomburg | 340/172.5 |
| 4,052,699 | 10/1977 | Micka et al. | 382/46 |
| 4,168,488 | 9/1979 | Evans | 382/46 |
| 4,271,476 | 6/1981 | Lotspiech | 364/515 |

OTHER PUBLICATIONS

IBM Technical Disclosure Bulletin, vol. 18, No. 8, Jan. 1976, pp. 2633-2639.
IBM Technical Disclosure Bulletin, vol. 17, No. 10, Mar. 1975, pp. 3026-3028.
IEEE Transactions on Computers, "A Fast Computer Method for Matrix Transposing", Jul. 1972, pp. 801-803.

Primary Examiner—Leo H. Boudreau
Assistant Examiner—Joseph Mancuso
Attorney, Agent, or Firm—Ronald F. Chapuran

[57] ABSTRACT

A method for the rotation of digital images which minimizes the number of disk accesses needed. It is useful where the size of the image is large compared with the available computer memory. In a first step, the image is divided into horizontal regions of equal size, such that each region can fit, and be manipulated in the computer memory. Each region is rotated separately, and a scratch file is produced, which contains, in sequence, the rotated regions. In a series of subsequent steps, the rotated regions are, in each step, doubled in size until one region contains the entire rotated image. The method works for any rotation angle.

2 Claims, 12 Drawing Figures

NONROTATED IMAGE

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

90° ROTATED IMAGE

| 0 | 8 | 16 | 24 | 32 | 40 | 48 | 56 |
|---|---|---|---|---|---|---|---|
| 1 | 9 | 17 | 25 | 33 | 41 | 49 | 57 |
| 2 | 10 | 18 | 26 | 34 | 42 | 50 | 58 |
| 3 | 11 | 19 | 27 | 35 | 43 | 51 | 59 |
| 4 | 12 | 20 | 28 | 36 | 44 | 52 | 60 |
| 5 | 13 | 21 | 29 | 37 | 45 | 53 | 61 |
| 6 | 14 | 22 | 30 | 38 | 46 | 54 | 62 |
| 7 | 15 | 23 | 31 | 39 | 47 | 55 | 63 |

FIRST STEP, FIRST PASS
A    0, 1, 2, 3, 4, 5, 6, 7, / 8, 9, 10, 11, 12, 13, 14, 15
B    0, 8, 1, 9, 2, 10, 3, 11, / 4, 12, 5, 13, 6, 14, 7, 15
DISK
FIG. 5
FIRST STEP, SECOND PASS
A    16, 17, 18, 19, 20, 21, 22, 23, / 24, 25, 26, 27, 28, 29, 30, 31
B    16, 24, 17, 25, 18, 26, 19, 27, / 20, 28, 21, 29, 22, 30, 23, 31
DISK
FIG. 6
SECOND STEP, FIRST PASS
A    0, 8, 1, 9, 2, 10, 3, 11, / 16, 24, 17, 25, 18, 26, 19, 27
B    0, 8, 16, 24, 1, 9, 17, 25, / 2, 10, 18, 26, 3, 11, 19, 27
DISK
SECOND STEP, SECOND PASS
C    4, 12, 5, 13, 6, 14, 7, 15, / 20, 28, 21, 29, 22, 30, 23, 31
D    4, 12, 20, 28, 5, 13, 21, 29, / 6, 14, 22, 30, 7, 15, 23, 31
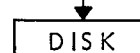
DISK
FIG. 8

FIRST STORE
0  8  1  9  2 10  3 11
4 12  5 13  6 14  7 15
16 24 17 25 18 26 19 27
20 28 21 29 22 30 23 31
32 40 33 41 34 42 35 43
36 44 37 45 38 46 39 47
48 56 49 57 50 58 51 59
52 60 53 61 54 62 55 63
THIRD STORE
0  8 16 24 32 40 48 56
1  9 17 25 33 41 49 57
2 10 18 26 34 42 50 58
3 11 19 27 35 43 51 59
4 12 20 28 36 44 52 60
5 13 21 29 37 45 53 61
6 14 22 30 38 46 54 62
7 15 23 31 39 47 55 63

SECOND STORE

DISK

FIG. 10

ROTATION OF DIGITAL IMAGES

This invention relates to digital images, and in particular, to the efficient rotation of digital images in various angles of rotation.

Prior systems such as shown in IBM Technical Disclosure Bulletin Vol. 17, No. 10, March 1975, and Vol. 18, No. 8, January 1976 disclose the use of shift registers for image orientation. Other systems such as shown in U.S. Pat. No. 4,000,486 describe a page memory access control having a plurality of registers associated with rows on a page to be printed. U.S. Pat. No. 4,271,476 shows a method for rotating images having a horizontal scan format into a vertical scan format. The digital image is divided into a plurality of sections, the scan direction of each section is rotated in sequence, and then the rotated sections are combined.

Another method of rotation is shown in an article in IEEE Transactions on Computers, July 1972, titled "A Fast Computer Method for Matrix Transposing". In particular, the article teaches a mathematical theory for rotation of matrices. However, by definition, the transposing of matrices is limited to a 90° rotation. In general, this is a difficulty with prior art methods of rotation. They are not readily adapted to the rotation of images through various angles.

Accordingly, it is an object of the present invention to provide a new and improved means to manipulate digital images. It is another object of the present invention to be able to rotate images through various angles of rotation. Further advantages of the present invention will become apparent as the following description proceeds, and the features characterizing the invention will be pointed out with particularity in the claims annexed to and forming a part of this specification.

Briefly, in a first step, the image is divided into horizontal regions of equal size, such that each region can fit, and be manipulated in the computer memory. Each region is rotated separately, and a scratch file is produced, which contains, in sequence, the rotated regions. In a series of subsequent steps, the rotated regions are, in each step, doubled in size until one region contains the entire rotated image. The method works for any rotation angle.

For a better understanding of the invention, reference is made to the following detailed disclosure of the invention taken in conjunction with the accompanying drawings wherein:

FIG. 1 is a block diagram of the relationship of various components of an image generating and display system;

FIGS. 2a, b, c, d and e illustrate in general the basic procedure for rotation of digital images through various angles in accordance with the present invention;

FIG. 5 are an exemplary first step, first pass in the rotation of a digital image in accordance with the present invention;

FIG. 6 illustrate the second pass of the first step of rotation;

FIG. 7 illustrates the first immediate store in the rotation of a digital image;

FIG. 8 illustrates the step 2, first and second passes in the access of the stored digital image shown in FIG. 7;

FIG. 9 illustrates the contents of the second intermediate store of the rotated segments of the image in accordance with the present invention;

FIG. 10 illustrates step 3 in the access of the image in the second store of FIG. 9; and FIG. 11 illustrates a completed 90° rotated image in accordacne with the present invention.

Figure 1:
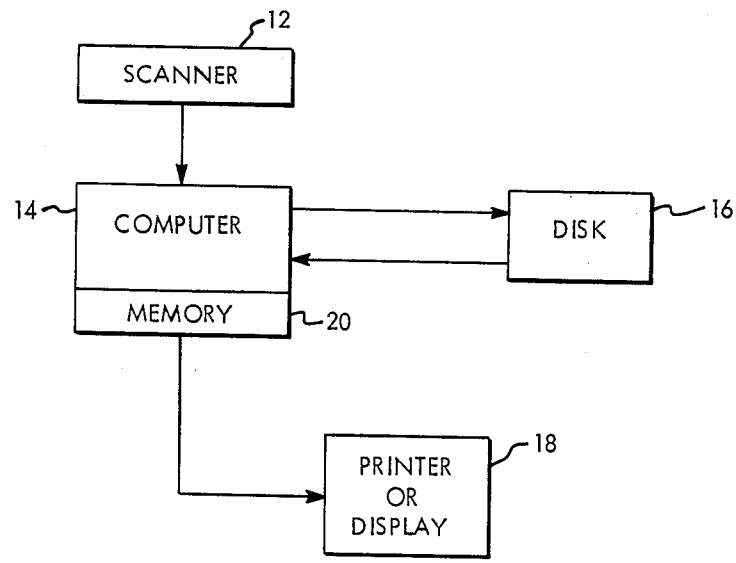

With reference to FIG. 1, there is shown a basic system for implementation of the present invention. In particular, there is illustrated a scanner 12 for converting an analog image into a digital counterpart, and conveying the image to a computer 14. It should be understood that the scanner 12 is only one method of providing a digital image to the computer 14. Also connected to the computer 14 are a disk memory 16 and a printer or display 18.

Integral with the computer 14 is a block of available memory space indicated at 20. In operation, images conveyed to computer 14 or to be manipulated or rotated by computer 14 are stored on disk 16. Since the images stored on disk 16 generally exceed the capacity of memory 20, the computer accesses portions of the images from disk 16 at a time for storage in memory 20 and manipulation by the computer. Manipulated portions are then conveyed back to the disk 16 into suitable storage locations.

Figure 2:
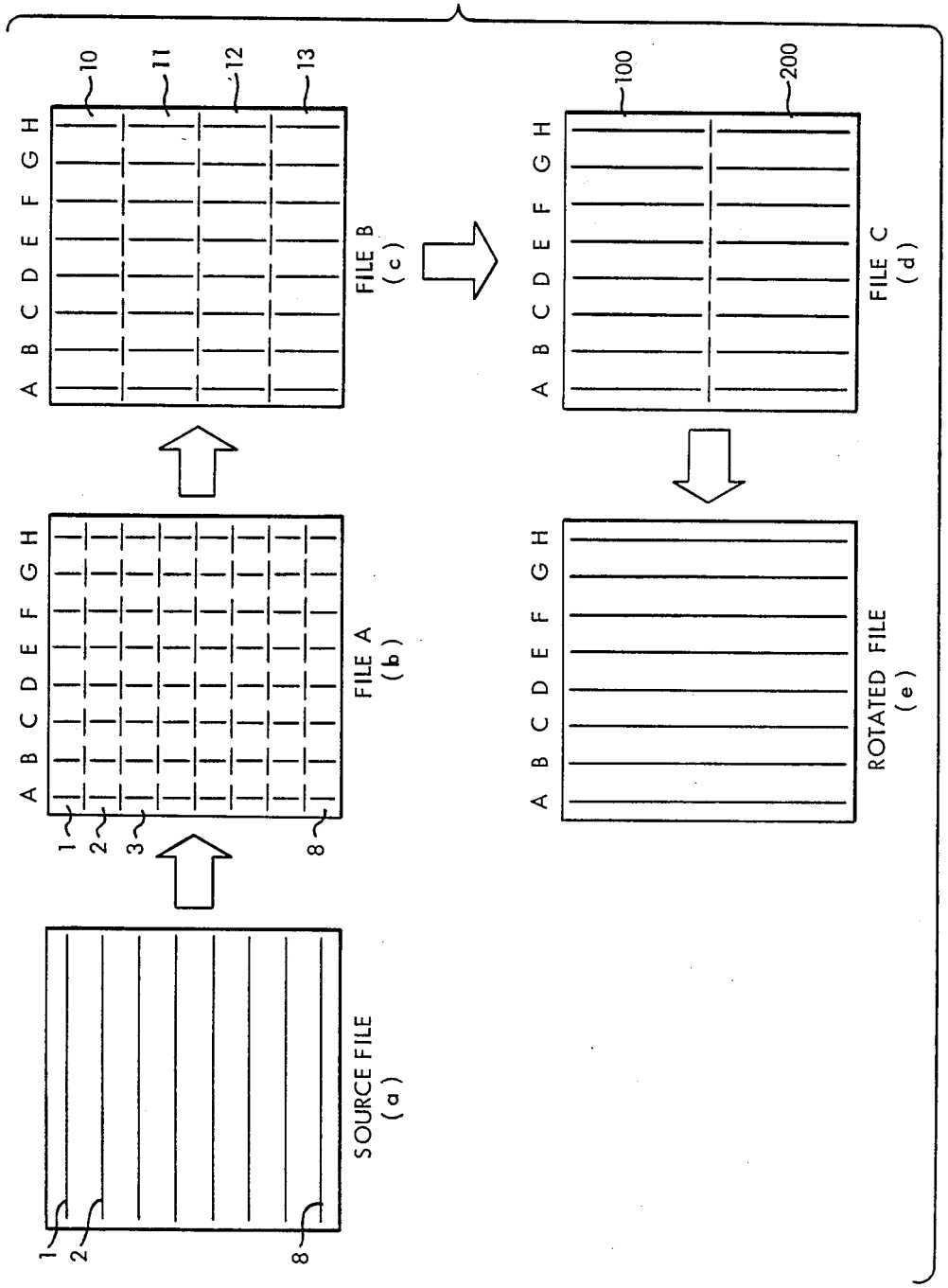

The general method for rotation of images for any degree of rotation is illustrated in FIGS. 2a-2e. In this example, assume that the computer buffer memory 20 can manipulate only one-eighth of the image at one time. Thus, the memory has the capacity for storing one-quarter of the image, but handles only one-eighth of the image at a time. That is, half of the memory 20 stores one-eighth of the image and the other half will receive the manipulated portion of the image. FIG. 2a illustrates the original image represented by an array of pixels, as stored on the disk and divided into eight regions, only one of the regions being manipulated in the buffer memory at one time. Each line or region 1–8 represent a plurality of pixels in a given orientation.

The computer 14 rotates each region separately and writes the result into a portion of memory 20 or any suitable scratch file, illustrated as for example File A in FIG. 2b. FIG. 2b illustrates the small rotated segments (as vertical lines) stored in File A. In particular, region (1) of FIG. 2a has been broken up into separate vertically rotated segments 1A, 1B, 1C, 1D, 1E, 1F, 1G and 1H. Likewise, regions 2, 3, . . . 8 have been broken up into vertically rotated segments 2A, 2B, 2C, 2D, 2E, 2F, 2G, 2H through 8A, 8B, 8C, 8D, 8E, 8F, 8G and 8H. The vertical lines 1A, 1B, . . . 8A represent the linking of pixels in regions 1, 2-8. Each vertical line represents two pixels. It should be noted that the rotation of region 1 into the discrete rotated segments illustrated at region 1 in FIG. 2b can be any arbitrary angle.

In the next step, illustrated in FIG. 2c, pairs of pixels from region 1 and pairs of pixels from region 3 in File A are combined. That is, the first half of the first region (1A, 1B, 1C, 1D) and the first half of the third region (3A, 3B, 3C, 3D) of File A are combined to form 10A, 10B, 10C, 10D of region 10 of File B as shown in FIG. 2c. In the next pass, the second half of region 1 of File A (1E, 1F, 1G, 1H) is combined with the second half of region 3 of File A (3E, 3F, 3G, 3H) to form 10E, 10F, 10G, 10H of region 10. Each vertical line 10A-10H is twice the length or size of the vertical lines having combined pixels from 1A–1H with pixels from 3A–3H.

In a similar manner, the first quarter of region 10 of File B is combined with the first quarter of region 12 of File B to form the first quarter of region 100 in File C. That is, segments 10A and 10B are combined with segments 12A and 12B to form the first quarter of segment 100 of File C, i.e. to form 100A, 100B. Thus, each vertical line 100A and 100B is twice the length of size of the vertical lines 10A–10H and 12A–12H. In the next pass, 10C and 10D are combined with 12C and 12D to form 100C, 100D and two more passes are required to complete 100A–100H.

Next, segments 11A, 11B are combined with 13A, 13B to form 200A, 200B; segments 11C, 11D combined with 13C, 13D to form 200C, 200D; segments 11E, 11F combined with 13E, 13F to form 200E, 200F; and 11G, 11H combined with 13G, 13H to form 200G, 200H. It should again be noted that each segment 100A–100H and 200A–200H is twice the size of the segments 10A–10H, 11A–11H, 12A–12H and 13A–13H of File B. That is, the vertical lines have doubled indicating twice the amount of pixels in each segment. Finally, segments 100A and 200A are combined to form final segment A of FIG. 2e represented by one continuous vertical line that is twice the length of the vertical lines in File C. In general, for any size image individually rotated segments are continually combined until the total image has been rotated. Then 100B, 200B . . . 100H, 200H are combined in succession to complete the rotation as illustrated in the rotated file.

Figure 3:
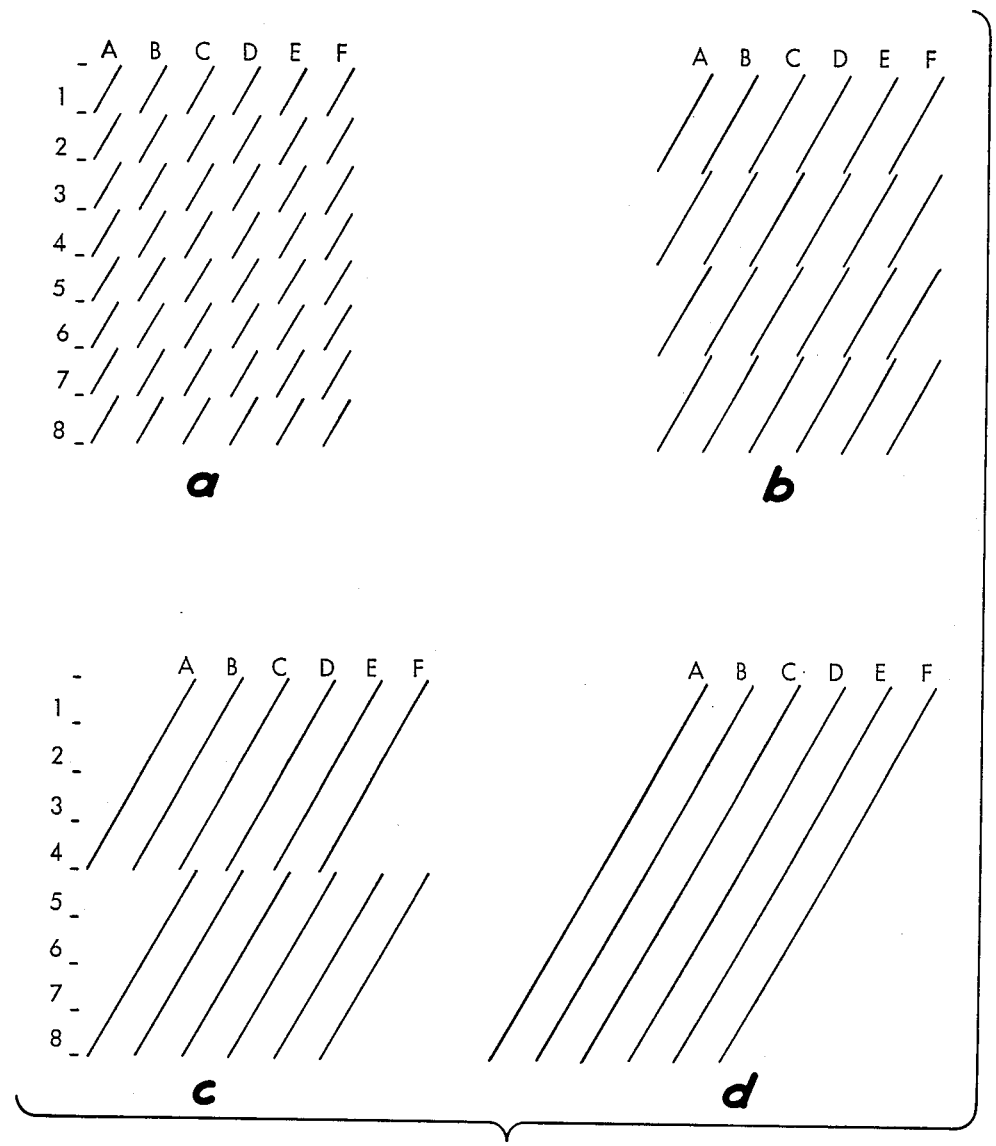
FIGS. 3a-3d illustrate the rotation of a digital image in an angle different from the angle shown in FIGS. 2a-2e.

FIGS. 3a–3d illustrate a rotation other than a 90° rotation. Assuming the same source file or original image as shown in FIG. 2a, FIG. 3a illustrates the rotation of each region of FIG. 2a into segments of an arbitrary angle, for example 60°. FIG. 3b illustrates the doubling of each segment of FIG. 3a by combining rows 1A–1F with rows 3A–3F maintaining a 60° rotation. Next, FIG. 3C illustrates again doubling each segment, still maintaining a 60° rotation, and finally FIG. 3d illustrates a completely rotated 60° image.

Figure 4A:
FIGS. 4a and 4b illustrate an original and 90° rotated image of an 8×8 pixel image.
Figure 4B:

With reference to FIGS. 4a and 4b, there is illustrated a specific example of the 90° rotation, FIG. 4b, of the source image, FIG. 4a. It should again be understood that a 90° rotation is described but that the technique applies to any angle of rotation. The image source, FIG. 4a is an 8×8 matrix, each number or member of the matrix representing a pixel. Assume for purposes of illustration, that the computer buffer memory 20 has capacity for four (4) of the image lines. It should also be understood that as a practical matter the number of pixels in an image would be far in excess of the illustrated example of an 8×8 pixel image and that the storage capacity to store the image would be far in excess of the available computer buffer memory.

With reference to FIG. 5, the first step of the procedure is to successively bring pairs of lines of the image into the computer buffer memory 20 for manipulation. In the first pass of the first step of procedure the first two lines of the non-rotated image (0, 1, 2, 3, 4, 5, 6, 7,/8, 9, 10, 11, 12, 13, 14, 15) are brought into the buffer memory as illustrated in FIG. 5, part A. Next, the first pixel of the first line is combined with the first pixel of the second line, the second pixel of the first line with the second pixel of the second line and so forth until the eighth pixel of the first line is paired with the eighth pixel of the second line. These paired pixels (0, 8, 1, 9, 2, 10, 3, 11/4, 12, 5, 13, 6, 14, 7, 15) are then stored back on the disk as shown in FIG. 5, part B. In this illustration, one half of the buffer memory 20 stores portions of the image to be manipulated, while the other half of the memory stores the manipulated segments which are then conveyed back to the disk.

This is the first access of the image on the disk. It should be noted that in this first pass only the first two lines of the image on the disk have been accessed rather than the whole image. The second pass is to take the next two lines (16, 17, 18, 19, 20, 21, 22, 23,/24, 25, 26, 27, 28, 29, 30, 31) of the nonrotated image on the disk as shown in FIG. 6, part A and store these two lines in the buffer memory 20. These lines are paired in a manner similar to the first two lines to provide a list of paired pixels from the third and fourth line as shown in FIG. 6, part B (16, 24, 17, 25, 18, 26, 19, 27,/20, 28, 21, 29, 22, 30, 23, 31). The contents of the buffer memory are then loaded back into a section of the disk.

Following the second pass, the fifth and sixth lines to be rotated, and then the seventh and eighth lines of the original image are brought from the disk into the computer memory to be rotated in the third and fourth passes. The result of this rotation is separately rotated regions temporarily stored in a first intermediate store as shown in FIG. 7. As illustrated, the first line is a sequence of pairs (0,8; 1,9; 2,10; 3,11) of the first four pixels of the first two lines of the nonrotated image. The second line in FIG. 7 is a sequence of pairs (4,12; 5,13; 6,14; 7,15) of the last four pixels of the first two lines of the nonrotated image. Similarly, the third line is a sequence of pairs (16,24; 17,25; 18,26; 19,27) of the first four pixels of the third and fourth lines of the nonrotated image to the eighth line, a sequence of pairs of the last four pixels of lines seven and eight of the source image.

An access is now made to the image stored in the first intermediate store shown in FIG. 7. This access or second step is similar to the access of the original nonrotated image, except that the first and third rows of the image in the first intermediate store are first brought into one half of the computer buffer memory 20 as shown in FIG. 8, part A. A rotation or melding of the rows one and three is then done in a manner similar to the first access, except the melding of the first row with the third row is done with pairs of pixels from each row rather than with single pixels from each row.

In other words, with reference to FIG. 8, part B, the zero and 8 together are linked with the 16 and 24. Thus, each rotated segment is now 4 pixels rather than a pair of pixels. That is, each rotated segment has been doubled. Then the 1 and 9 are linked with the 17 and 25, the 2 and 10 are linked, and the 18 and 26, and the 3 and 11 paired with the 19 and 27. These rows are then conveyed back onto the disk into a second intermediate store in FIG. 9. As in the first step, the melded or manipulated first and third rows are stored in the other half of the buffer memory 20 before being conveyed back to the disk.

Step 2, second pass brings the second and fourth rows from the first intermediate store in FIG. 7 into the computer buffer memory with a linking of pairs, as shown in FIG. 8, part C. In particular, the rows (4, 12, 5, 13, 6, 14, 7, 15) and (20, 28, 21, 29, 22, 30, 23, 31) are brought into the computer buffer memory. The rotation of the rows results in rows (4, 12, 20, 28, 5, 13, 21, 29) and (6, 14, 22, 30, 7, 15, 23, 31) as illustrated in FIG. 8, part D. These rows are then stored onto the disk into the second intermediate store. Similarly, rows five and seven and six and eight are brought into the input buffer during passes 3 and 4 of the second step and stored in the intermediate store. The result of this access of the first intermediate store is a second intermediate store with rotated segments and storage in the second intermediate store as illustrated in FIG. 9.

Only one more access to the disk or step 3 is needed for a complete 90° rotation of the source image. With reference to FIG. 10, the first and fifth rows of the image as stored in the second intermediate store (FIG. 9) are brought into the computer buffer memory as shown in FIG. 10, part A, i.e. rows (0, 8, 16, 24, 1, 9, 17, 25) and (32, 40, 48, 56, 33, 41, 49, 57). This is the first pass of step 3. This time instead of merging the two lines into groups of four pixels, the two lines are merged into two groups of four or eight pixels as illustrated in FIG. 10, part B where the first line is (0, 8, 16, 24, 32, 40, 48, 56).

In other words, the first four pixels (0, 8, 16, 24) of line one in FIG. 10, part A have been linked with the first four pixels (32, 40, 48, 56) of line two. In a similar manner, lines two and six, pass 2 of step 3; three and seven, pass 3; and four and eight, pass 4, from the image as stored in the second intermediate store, FIG. 9, are merged and conveyed to the disk as shown in FIG. 11.

FIG. 11 then is the final 90° rotation of the original image. By continually doubling the length of rotated segment for each step of the procedure, eventually a completely rotated image is obtained. Appendix A is a listing of the method for the efficient rotation of image from 0 to about 89°.

One half of the buffer memory has been allocated for storing portions of the image to be manipulated and one half the memory has been allocated for storing the manipulated portion, for illustration purposes. However, it should be noted that in a preferred embodiment, after the first step of manipulation, the buffer memory 20 is actually divided into three sections. Two of the sections store portions of the image to be manipulated and the third section will store one half of the manipulated image in successive operations. Each one half manipulated segment is then immediately conveyed to the disk.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

APPENDIX A

```
// rotB,bcpl  --  2161 (1137) WORD get "aisRolDefs.d"

external
[ FLD      // Float
  FLDI
  FST
  FDV
  FML
  FAD
  FSB
  FNEG
  FTR
  FCM
  FSN
]

//COMPUTES THE GEOMETRICAL AND DATA HANDLING
//                    PARAMETERS
``` let Geometry(dx,dy) be
[
Space=Zone-StartSpace-TablesBuffer
Space=Space-(Space & 1)

let v=vec 2
  sin=v
  let v=vec 2
  cos=v
  let v=vec 2
  tan=v
  let v=vec 2
  cot=v
  trigonometry(dx,dy)
  Parameters()
  MoreParams()
  FindNumLines()
]

and Parameters() be
[
let dummy=vec 2

FLDI(0,OldLength)     //OldLength
FLDI(1,OldLength)     //OldLength
FLDI(2,OldHeight)     //OldHeight
FLDI(3,OldHeight)     //OldHeight FML(0,sin)     //OldLength*sin
FML(1,cos)     //OldLength*cos
FML(2,sin)     //OldHeight*sin
FML(3,cos)     //OldHeight*cos FST(2,dummy)
Normalize(dummy, lv IntegP1, lv FracP1)

FAD(2,1)   //NewLength=OldHeight*sin+OldLength*cos
FAD(3,0)   //NewHeight=OldHeight*cos+OldLength*sin FST(2,dummy)
Normalize(dummy, lv IntegP4Th, lv FracP4Th)   //corner threshold
NewLength=Round(dummy)
NewLengthPlusOne=NewLength+1
NewLengthPlusOne=NewLengthPlusOne+(NewLengthPlusOne & 1)
NewLength=NewLengthPlusOne-1

NewHeight=FTR(3)
NewHeightPlusOne=NewHeight+1

// Integx0Start=OldLengthPlusOne & 1
// OldLengthPlusOneHalf=(OldLengthPlusOne rshift 1)+Integx0Start
// if ClockWise eq true then Integx0Start=0
// for starting position with ChangeSense
NewLengthPlusOneHalf=NewLengthPlusOne rshift 1

// find P4
FLD(1,0)   //OldLength*sin
let u=FTR(1)+1   //integ(OldLength*sin)+1
FLDI(1,u)
FSB(1,0)
FML(1,tan)
FSB(2,1)
FST(2,dummy)
Normalize(dummy, lv IntegP4, lv FracP4)

// find QCos and QSin
   FLDI(1,Q)
   FML(1,cos)      //QCos
   QCos=FTR(1)
   FLD1(1,Q)
FML(1,sin)        //QSin
QSin*FTR(1)

```
        // find parameters
    Normalize(tan, lv IntegTan, lv FracTan)
    Normalize(cot, lv IntegCot, lv FracCot)
    FLDI(0,1)
    FDV(0,sin)
    FST(0,dummy)
    Normalize(dummy, lv IntegInvSin, lv FracInvSin)
    FLDI(0,1)
    FDV(0,cos)
    FST(0,dummy)
Normalize(dummy, lv IntegInvCos, lv FracInvCos)
]

and MoreParam() be
[
let u,v,w=nil,nil,nil
let dummy=vec 2 u=Geometry-Rotate
SectorSize=(Space+u)/3
SectorSize=SectorSize-(SectorSize & 1)
Space=Space-SectorSize BoxHeight=(Space/OldLengthPlusOneHalf)-1
if BoxHeight gr OldHeightPlusOne then BoxHeight=OldHeightPlusOne
NumAreas=(OldHeight+BoxHeight-1)/BoxHeight
LastBoxHeight=OldHeight-(NumAreas-1)*BoxHeight
LastLineButOne=(BoxHeight-1)*OldLengthPlusOneHalf
LastBlockLastLineButOne=(OldHeight-1-(NumAreas-1)*BoxHeight)
*OldLengthPlusOneHalf
CountIn=(BoxHeight+1)*OldLengthPlusOneHalf
LastCountIn=(LastBoxHeight+1)*OldLengthPlusOneHalf FLDI(0,BoxHeight)          //find LineLengthOut
FLDI(1,OldLength)
FDV(0,1)
```

```
u=FCM(0,tan)
test u ls 0
ifso
    [
FLDI(0,BoxHeight)
FLDI(1,1)

FAD(0,1)
FDV(0,sin)
    ]
ifnot
    [
FLDI(0,OldLengthPlusOne)
FDV(0,cos)
    ]
FLDI(1,2)
FDV(0,1)
FST(0,dummy)
LineLengthOut=Round(dummy)+3 let HalfOldHeight=OldHeight rshift 1    //find NumCombinations
HalfOldHeight=HalfOldHeight=(HalfOldHeight & 1)
FLDI(0,HalfOldHeight)
FLDI(1,OldLength)
FDV(0,1)
u=FCM(0,tan)
v=BoxHeight
test u ls 0
ifso w=HalfOldHeight
ifnot
     [
FLDI(0,OldLength)
FML(0,tan)
FST(0,dummy)
w=Round(dummy)
     ]
NumCombinations=0
```

```
until v ge w do
    [
NumCombinations=NumCombinations+1
v=v lshift 1
    ]

FLDI(0,BoxHeight)      //find NumLinesPerAreaOut
FLDI(1,OldLength)
FML(0,cos)
FML(1,sin)
FAD(0,1)
FST(0,dummy)
NumLinesPerAreaOut=Round(dummy)+1

NumLinesPerSectorOut=SectorSize/LineLengthOut

]

and FindNumLines() be
[
FLD(0,cos)
FLDI(1,BoxHeight)
FLDI(2,Q)
FML(0,1)   //BoxHeight*cos
FLD(3,0)
NumLines1=FTR(3)
FLD1(3,NumLines1)
FSB(0,3)
FML(0,2)
IncFracNumLines=FTR(0)
test IncFracNumLines
    ifnot NumLines2=NumLines1
    ifso NumLines2=NumLines1+1

// find the increment of corner threshold
FLD(0,sin)
FLDI(1,BoxHeight)
```

```
FML(0,1)
let dummy=vec 2
FST(0,dummy)
Normalize(dummy, lv IncIntegP4Th, lv IncFracP4Th)

// find number of side lines
FLDI(0,OldHeight)
FML(0,cos)
RemSideLines=FTR(0)+1

// find interm, files size
//      let v=1
//      until v ge NumAreas do [ v=v lshift 1 ]
//      unless v eq 1 do v=v rshift 1 let u=vec 1 let linelength=LineLengthOut
let baselines=NumLinesPerAreaOut+1-NumLines1
let sidelines=NumLines2
let numareas=(NumAreas+1) rshift 1
let headers,areasize,filesize=nil,nil,nil
let effheight=BoxHeight+2
IntermFileSize=0

FLDI(0,OldLengthPlusOneHalf)
FLDI(1,effheight)
FML(0,1)
headers=(sidelines lshift 1 )+baselines+2
FLD1(1,headers)
FAD(0,1)
FST(0,u)

for n=0 to NumCombinations do
        [
FLD(0,u)
FLDl(1,Sector Size-linelength-3)
```

```
FDV(0,1)
AreaSizeVec!FTR(0)+1
filesize=(AreaSizeVec!n)*numareas
if filesize gr IntermFileSize then IntermFileSize=filesize linelength=line length lshift 1
if linelength gr NewLengthPlusOneHalf+3 then linelength=NewLengthPlusOneHalf=3
numareas=(numareas+1) rshift 1
FLD(0,u)
FLDI(1,2)
FML(0,1)
FLDI(1,baselines-1)
FSB(0,1)
FST(0,u)
    ]

FileSizeOut=AreaSizeVec!0
if LastBoxHeight eq BoxHeight then IntermFileSize=IntermFileSize+1

//      for k=1 to Numcombinations do
    //          [
//      AreaSizeVec!k=(AreaSizeVec!(k-1)) lshift 1
//          ]
]

///////////////

// MATHEMATICAL FUNCTIONS and Trigonometry(dx,dy) be    //given a,b find tan=a/b,and sin, cos, cot
[
  let a,b,sint,cost,tant,cott=nil,nil,nil,nil,nil
  test dy le dx
  ifso
      [
  a=dy
  b=dx
  sint=sin
``` cost=cos tant-tan cott=cot

]

ifnot

[ a=dx b=dy sint=cos cost=sin tant=cot cott=tan

]

FLDI(0,a)

FLDI(1,b)

FDV(0,1)        //a/b

FST(0,tant)      //store tant

FLDL(1,1)       //store 1

FDV(1,0)        //(b/a)

FST(1,cott)      //store cott

FLD(1,0)

FML(1,1)        //(a/b)square

FLD1(2,1)      //store 1

FAD(1,2)        //(a/b)square+1 ==A

// find square root

FLDI(3,Q)

FDV(2,3)        //(1/Q)    acceptable error

FLD1(6,100)     //for better accuracy

FDV(2,6)

FLDI(3,2)       //for later division by 2 let utest=0 while utest ne 1 do

[

FLD(5,4)        //guess ==X

FML(5,5)        //guess square

```
    FNEG(5)
    FAD(5,1)           //A=Xsq
    FLD(6,5)           //testing
        let u=FSN(6)
    if u eq -1 then FNEG(6)
    utest=FCM(2,6)
    FDV(5,3)           //divide by 2
    FDV(5,4)           //divide by X
    FAD(4,5)           //new guess
    ]
            //find cost
            //   sint FLDI(1,1)
    FDV(1,4)           //COST
    FST(1,cost)        //store cost FDV(0,4)           //sint
    FST(0,sint)        //store sint
]

//find the integer value and multiply the fractional
        //value by Q
and Normalize(dummy, lvI, lvF) be
[ let Int=nil
  FLD(7,dummy)
  FLD(8,7)
  Int=FTR(8)
  FLDI(8,Int)
  FSB(7,8)
  FLDI(8,Q)
  FML(7,8)
  rv lvI=Int
  rv lvF=FTR(7)
]

// rounds a floating point number upwards to an integer
and Round(x)=valof
[ FLD(0,x)
```

```
    FLD(1,0)
    let u=FTR(1)
    FLDI(1,u)
    FSB(0,1)
    if FSN(0) ne 0 then [ u=u+1 ]
    resultis u
]
```

////////////////////

```
// rotC.bcpl --  3442 (1826) WORDS
get "aisRotDefs.d"

static
[
FirstBlock
@   Pixel1
@   Pixel2
@   Pixel3
@   Pixel4
@   PixelValue
@   Pointer

]

// ROTATION OF BLOCKS let Rotate() be
[
let dp=nil
PointerReadZero=StartSpace+TablesBuffer
PointerWriteZero=PointerReadZero+Space
LastLineButOne=LastLineButOne+PointerReadZero
LastBlockLastLineButOne=LastBlockLastLineButOne+PointerReadZero
ThresholdW=PointerWriteZero+SectorSize-LineLengthOut
```

```
StartFile=0
  BoxH=BoxHeight
  Integy0=0
  Fracy0=0
  Tint=StartSpace
  1PosNear=TInt+2048
  TPosFar=TPosNear+B
  Tcos=TPosFar+B
  Tsin=Tcos+65
    Tables1()
    TAbles2()
    FirstLineIn=0
    FirstLineOutA=0
    FirstLineOutB=0
    IntegP3Store=IntegP1
    FracP3Store=FracP1
  FracNumLinesA=Q
  FirstBlock=true
  for k=1 to NumAreas do
      [
      dp=((k lshift 4)-1)/NumAreas
      DisplayPointer(dp,#144023,#147763)
      RotateBlock(k)
      FirstBlock=false
      ]
]

and RotateBlock(numblock) be
[
let Count =nil
FirstLineOut=StartFile
test ( numblock & 1) ne 0
ifso IntermWindow=IntermWindow1A
ifnot IntermWindow=IntermWindow1B
test numblock eq NumAreas
ifnot
    [
CountNumLinesA()
```

```
Count=CountIn
    ]
ifso
    [
NumLines=RemSideLines
BoxH=LastBoxHeight
Count=LastCountIn
LastLineButOne=LastblockLastLineButOne
    ]
test border
    ifso ReadArea(numblock)
    ifnot
    [
    test ChanSen1
    ifnot
            [
    ReadAISScanLineS(OldWindow,FirstLineIn,BoxH+1,Count,PointerReadZero)
    FirstLineIn=FirstLineIn+BoxHeight
            ]
    ifso

[
    ReadAISScanLineS(OldWindow,FirstLineIn,BoxH+1,Count,PointerReadZero+
    OldLengthPlusOneHalf)
    FirstLineIn=FirstLineIn+BoxHeight
    ChangeSense(BoxH,PointerReadZero,OldLengthPlusOneHalf)
            ]
        ]
    Switch1=false
    Switch2=false
    IntegP3=IntegP3Store
    FracP3=FracP3Store
    R=IntegP3
    P=IntegP1
    PointerWrite=PointerWriteZero
let WriteZeros =true
    // StartLine=Integy0*OldLengthPlusOneHalf
StartLine=Integy0*OldLengthPlusOneHalf+PointerReadZero
    Integx0=Integx0start
```

```
    Fracx0=0
test numlock eq NumAreas
ifso rv PointerWriteZero=NumLinesPerAreaOut
ifnot rv PointerWriteZero=NumLines
rv (PointerWriteZero+1)=NumLinesPerAreaOut
PointerLineWrite=PointerWriteZero+2//////////////
for i=1 to NumLines do
    [
WriteLine(true,WriteZeroes)
counters(true)
    ]
if numblock be NumAreas then WriteZeroes =false
        //Initialize for sidebox=false
StartLine=LastLineButOne
Integy0=Integy0-BoxH
if Integy0 ls 0 then [ Integy0=0 ; Fracy0=0 ]   //quick fix Multiply(Integy0,Fracy0,IntegInvSin,FracInvSin, lv IntegP2, lv FracP2)
IntegP2=IntegP2+IntegP1
FracP2=FracP2+FracP1
if FracP2 ge Q then
    [
IntegP2=IntegP2=1
FracP2=FracP2-Q
    ]
Multiply(Integy0,Fracy0,IntegCot,FracCot, lv Integx0, lv Fracx0)
Integx0=Integx0+Integx0Start
        //end initialization IntegP3Store=IntegP2
    FracP3Store=FracP2
    P=IntegP2 for i=NumLines+1 to NumLinesPerAreaOut do
        [
WriteLine(false,WriteZeroes)
Counters(false)
        ]
```

```
if Switch2 eq false then
    [
IntegP4=IntegP4-IntegTan
FracP4=FracP4-FracTan
if FracP4 ls 0 then
        [
IntegP4=IntegP4-1
FracP4=FracP4+Q
        ]
    ]
if PointerLineWrite ne PointerWriteZero then
    [
WriteAISScanLineS(IntermWindow,FirstLineOut,1,SectorSize,PointerWriteZero)
// PointerWrite and PointerLineWrite are reset at the beggining of the proc.
    ]
if ( numblock & 1 ) eq 0 then StartFile=StartFileFileSizeOut
]

and WriteLine(side,WriteZeroes) be
[
   test Switch2
       ifso PP=0
       ifnot PP=R-P
let NumWords,v,u=1,0,nil
PointerWrite=PointerLineWrite////////

// initialize counters x and y
test side  //Integx is left as it is to avoid working with a
          //negative number,
ifso
   [
Integx=Integx0Start
u=(Q-FracP1) rshift 8
Fracx=Tcos!u
Line=StartLine
Fracy=Fracy0-Tsin!u
if Fracy ls 0 then
       [
```

```
Line=Line-OldLengthPlusOneHalf
Fracy=Fracy+Q
    ]
  ]

ifnot
   [
Line=LastLineButOne
u=(Q-FracP2) rshift 8
Integx=Integx0
Fracx=Fracx0+Tcos!u
if Fracx ge Q then
      [
Fracx=Fracx-Q
Integx=Integx+1

]
Fracy=Q-1-Tsin!u
  ]
      // end initialization let P0dd=P & 1 if WriteZeroes eq true then
   [
   PointerWrite=PointerWrite+1
   rv PointerWrite=P rshift 1
   NumWords=NumWords+1
   ]

if (PP be 0) & (P0dd eq 1) do
      [
            PointerWrite=PointerWrite+1
            Interpolate()
            rv PointerWrite=PixelValue+OutUpByte
            NumWords=NumWords+1
```

```
            PP=PP-1
    ]
until PP eq 0 do
    [
        PointerWrite=PointerWrite+1
        Interpolate()
        NumWords=NumWords+1
        rv PointerWrite=PixelValue lshift 8
        PP=PP-1
        test PP eq 0
        ifso rv PointerWrite=(rv PointerWrite)+OutloByte
        ifnot
            [
        Interpolate()
        rv PointerWrite=(rv PointerWrite)+PixelValue
        PP+PP-1
            ]
    ]

test P0dd
        ifnot rv PointerLineWrite=NumWords
        ifso rv PointerLineWrite=-NumWords PointerLineWrite=PointerLineWrite+NumWords/////// if PointerLineWrite gr ThresholdW then
    [
WriteAlSScanLineS(IntermWindow,FirstLineOut,1,SectorSize,PointerWriteZero)
FirstLineOut=FirstLineOut+1
PointerLineWrite=PointerWriteZero

]

]

and Interpolate() be
[
```

```
let w,unear,ufar,vnear,vfar=nil,nil,nil,nil,nil
test Int eq 0
ifso PixelValue=64  //dummy interpolation
ifnot
    [
    pointer=Line+(Integx rshift 1)

test (Integx & 1) eq 0  //find the right pixels
ifso
        [
    Pixel1+(rv pointer) rshift 8
    Pixel2=(rv Pointer) & #377
    pointer=pointer+OldLengthPlusOneHalf
    Pixel3=(rv pointer) rshift 8
    Pixel4=(rv pointer) & #377
        ]
ifnot
        [
    Pixel1=(rv pointer) & #377
    Pixel2=(rv pointer+1)) rshift 8
    pointer=pointer+OldLengthPlusOneHalf
    Pixel3=(rv pointer) & #377
    Pixel4=(rv pointer+1))shift 8
        ]

test Int eq 1
ifso             //nearest neighbor interpolation
          [
test Fracy le QHalf
    ifso
          [
       test Fracx le QHalf
            ifso PixelValue=Pixel1
            ifnot PixelValue=Pixel2
              ]
ifnot
              [
       test Fracx le QHalf
       ifso PixelValue=Pixel3
```

```
         ifnot PixelValue=Pixel4
             ]
     ]
ifnot              //cosine square interpolation
     [
   unear= (Fracx rshift 3) & #3400
   vnear= (Fracy rshift 3) & #3400
   ufar=(not unear) & #3400
   vfar=(not vnear) & #3400 w=TInt!(Pixel1+unear)
   PixelValue=TInt!(w+vnear)

w=TInt!(Pixel2+ufar)
   PixelValue=PixelValue+TInt!(w+vnear)

w-TInt!(Pixel3+unear)
   PixelValue=PixelValue+TInt!(w+vfar)

w=TInt!(Pixel4+ufar)
   PixelValue=PixelValue+TInt!(w+vfar)
         ]
     ]
Fracy=Fracy+QSin      //increment to next pixel
    if Fracy ls 0 then
          [
   Line=Line-OldLengthPlusOneHalf
   Fracy=Q-Fracy
          ]
   Fracx=Fracx+QCos
   if Fracx ge Q then
             [
   Integx=Integx+1
   Fracx=Fracx-Q
          ]
     ]
``` and Counters(side) be
[
   test side
   ifso
      [
   Integy0=Integy0+IntegInvCos
   for i=1 to IntegInvCos do
      [
   StartLine=StartLine+OldLengthPlusOneHalf
      ]
   Fracy0=Fracy0+FracyInvCos
   if Fracy0 ge Q then
      [
   Integy0=Integy0+1
   Fracy0=Fracy0-Q
   StartLine=StartLine+OldLengthPlusOneHalf
      ]

IntegP1=IntegP1-IntegTan
   FracP1=FracP1-TracTan
   if FracP1 ls 0 then
      [
   IntegP1=IntegP1-1
   FracP1=FracP1+Q
      ]
   P=IntegP1
   FracP=FracP1
   ]
   ifnot
      [
   IntegP2=IntegP2+IntegCot
   FracP2=FracP2+FracCot
   if FracP2 ge Q then
      [
   IntegP2=IntegP2+1
   FracP2=FracP2-Q
      ]

```
                ]
            ]
        ifso
            [
        if Switch2 eq false then
                    [
        IntegP4=IntegP4-IntegTan
        FracP4=FracP4-FracTan
        if FracP4 ls 0 then
                        [
        IntegP4=IntegP4-1
        FracP4=FracP4+Q
                        ]
        R=IntegP4
        if (P eq IntegP4 & FracP ge FracP4 ) % ( P gr integP4) %
(IntegP4 ls 0) then Switch2=true
            ]
        ]
    ]

and CountNumLines a() be
[
    FracNumLinesA=FracNumLinesA+IncFracNumLines
    test FracNumLinesA le Q
    ifso NumLines=NumLines1
    ifnot [ NumLines=NumLines2
        FracNumLinesA=FracNumLinesA-Q ]
    RemSideLines=RemSideLines-NumLines
]

and ReadArea(numblock) be
[
let box=boxH+1
PointerRead1=PointerReadZero+OldLengthPlusOneHalf+(box lshift 1)
PointerWrite=PointerReadZero
if numblock eq 1 then
        [
```

```
Integx0=Integx-+IntegInvSin
Fracx0=Fracx0+FracInvSin
if Fracx0 ge Q then
        [
Integx0=Integx0+1
   Fracx0=Fracx0-Q
        ]

P=IntegP2
FracP=FracP2

]

//counter PP
test Switch1 eq true
ifnot
[
IntegP3=IntegP3+IntegCot
FracP3=FracP3+FracCot
if FracP3 ge Q then
        [
IntegP3=IntegP3+1
FracP3=FracP3-Q
        ]
R=IntegP3
if ( IntegP3 eq IntegP4Th & FracP3 ge FracP4Th ) % ( IntegP3 gr IntegP4Th ) then
     [
R=IntegP4
Switch1=true
IntegP4th=IntegP4th-IncIntegP4th
FracP4Th=FracP4Th-IncFracP4Th
if FracP4Th ls 0 then
        [
IntegP4Th=integP4Th-1
FracP4Th=FracP4Th+0
        ]
   if ( P eq IntegP4 & FracP ge FracP4 ) % ( P gr IntegP4 ) % (IntegP4 ls 0)
then Switch2=true
```

```
box=box-1
SetBlock(PointerWrite,OutWord,OldLengthPlusOneHalf)
PointerWrite=PointerWrite+OldLengthPlusOneHalf
PointerRead1=PointerRead1+OldLengthPlusOneHalf
      ]
if numblock eq NumAreas then box=box-1

Count=vLengthMin*box

ReadAISScanLineS(OldWindow,FirstLineIn,box,count,PointerRead1)
FirstLineIn+FirstLineIn+box-1 if (OldLengthPlusOne & 1) eq 1 do
      [
PointerLineRead1=PointerRead1+vLengthMin-1
   for i=1 to box do
         [
rv PointerLineRead1=((rv PointerLine Read) & #177400)+#377
PointerLineRead1=PointerLineRead)+LengthMin
         ]
      ]
test ChanSen1
   if not
      [
   for i=1 to box do
         [
rv PointerWrite=OutWord
PointerWrite=PointerWrite+1
MoveBlock(PointerWrite,PointerRead1,vlengthMin)
PointerRead1=PointerRead1+vLengthMin
PointerWrite=PointerWrite+vLengthMin
rv PointerWrite=OutWord
PointerWrite=PointerWrite+1
         ]
      ]
   ifso
      [
   PointerLineRead1=PointerRead1+vLengthMin-1
   for i=1 to box do
```

```
        [
rv PointerWrite=OutWord
PointerWrite=PointerWrite+1
PointerRead1+PointerLineRead1
    for j=1 to vLengthMin do
            [
rv PointerWrite=(((rv PointerRead1) & #177400) rshift 8)+(((rv PointerRead1) & #377)
lshift 8)
PointerRead1=PointerRead1-1
PointerWrite=PointerWrite+1
            ]
rv PointerWrite=OutWord
PointerWrite=PointerWrite+1
PointerLineRead1=PointerLineRead1+vLengthMin
        ]
    ]
if numblock eq NumAreas then SetBlock(PointerWrite,OutWord,OldLengthPlusOneHalf)
]
        //////////////////

//multiplies modulo Q
and Multiply(lA,FA,IB,FB, lvIR, lvFR) be
[ let u,v,w,Int,Frac=nil,nil,nil,nil,nil
    let X=vec 2
    let Y=vec 2
    u=IA*IB
    DoubleMultiply(X,IS,FB)
    v=DoubleDivide(X,Q)         //Integ of IA*frB
    DoubleMultiply(Y,IB,FA)
    w=DoubleDivide(Y,Q)         //Integ of IB*frA
    Int=u+v+w
    u=lA*FB & #37777            //Q*(frac of (IA*frB))
    v=lB*FA & #37777            //Q*(frac of (IB*frA))

DoubleMultiply(Y,FA,FB)
    w=DoubleDivide(Y,Q)         //Q*frA*frB
    Frac=u+v
    if Frac ge Q then
        [ Frac=Frac-Q
```

```
            Int=Int+1
    Frac=Frac+w
    if Frac ge Q then
        [ Frac=Frac-Q
          Int=Int+1 ]
    rv lvIR=Int
    rv lvFR=Frac
]

//tables for interpolating the starting values of x and y
    and Tables1() be
[
    for i=0 to 64 do
    [
        Tcos!i=MulDiv(QCos,i,64)
        Tsin!i=MulDiv(QSin,1,64)
    ]
]

//tables for Pixel value interpolation
and Tables2() be
[ TPosNear!0=0
  TPosFar!0=1792      //256*7
  for i=1 to 7 do
  [ TPosNear!i=TposNear!(i-1)+256
    TPosFar!i=TPosFar!(i-1)256 ]
  let u=234+128       // (234=cos(PI*3/32)**2)*256
  let v=-199+28       // (199=cos(PI*5/32)**2)*256
  let w=-153+128      // (153=cos(PI*7/32)**2)*256
  for i=0 to 255 do
  [ u=u+234
    v=v+199
    w=w+153
    TInt!i=i
    TInt!(i+256)=u rshift 8
    TInt!(i+512)=v rshift 8
    TInt!(i+768)=w rshift 8 ]
```

```
    for j=4 to 7 do
    [ for i=0 to 255 do
        [ TInt!(i+TPosNear!j)=i-TInt!(i+TPosFar!j) ] ]
]
```

///////////

//rotD,bcpl -- 3053 (1579) WORDS

```
get "aisRotDefs.d"
let Shuffle() be
[
let u,v,dp=nil,nil,nil
PointerWriteZero=Rotate+(Rotate & 1)+NewLengthPlusOneHalf
PointerReadZero1=PointerWriteZero+SectorSize
PointerReadZero2=PointerReadZero1+SectorSize
let IncAreaLines=NumLines2
WindowInA-IntermWindow2A
WindowInB-IntermWindow2B
WindowOutA=IntermWindow1A
WindowOutB=IntermWindow1B
for j=1 to Numcombinations do
        [
dp=((j lshift 4)-1)/Numcombinations
DisplayPointer(dp,#170017,#177777)
u=WindowInA
WindowInA=WindowOutA
WindowOutA=u
u=WindowInB
WindowInB=WindowOutB
WindowOutB=u
LineLengthIn=LineLengthOut
LineLengthOut=LineLengthIn lshift 1
if LineLengthOut gr ( NewLengthPlusOneHalf+3 ) then
LineLengthOut=NewLengthPlusOneHalf+3
NumLinesPerSectorIn=NumLinesPerSectorOut
NumLinesPerSectorOut=SectorSize/LineLengthOut
NumLinesPerAreaOut=NumLinesPerAreaOut+IncAreaLines
```

IncAreaLines=IncAreaLines lshift 1
FileSizeIn=FileSizeOut
// FileSizeOut=(NumLinesPerAreaOut+NumLinesPerSectorOut-1)/
NumLinesPerSectorOut
FileSizeOut=AreaSizeVec!j
ThresholdW=PointerWriteZero+SectorSize-LineLengthOut
ThresholdR1=PointerReadZero1+SectorSize-LineLengthIn
ThresholdR2=PointerReadZero2+SectorSize-LineLengthIn
StartFileLineIn=0
StartFileLineOut=0 u=0
v=NumAreas & 1
NumAreas=(NumAreas rshift 1)+v for i=1 to NumAreas do
    [
if i eq NumAreas then u=v
FirstLineOut=StartFileLineOut
FirstLineIn1=StartFileLineIn
FirstLineIn2=StartFileLineIn test ( i & 1 ) eq 1
ifso WindowOut=WindowOutA
ifnot
        [
WindowOut=WindowOutB
StartFileLineOut=StartFileLineOut+FileSizeOut
        ]
StartFileLineIn=StartFileLineIn+FileSizeIn
AddTwoAReas(u)
    ]
  ]
]

and AddTwoAReas(LastAreaAndOdd) be
[
let numSideLines1,numSideLines2,numLinesPerArea1,numLines PerARea2=nil,nil,nil,nil PointerLineWrite=PointerWriteZero
ReadSector1()
numSideLines1=rv PointerReadZero1
numLinesPerArea1=rv (PointerReadZero1+1)
let numwords2,numwords1,u,v,w=nil,nil,nil,nil,nil test LastAreaAndOdd eq false//////////////////////////////////// ifso//////////////////////////////////////
        [
ReadSector2()
numSideLines2=rv PointerReadZero2
numLinesPerArea2=rv (PointerReadZero2+1)
rv PointerWriteZero=numSideLines1+numSideLines2
rv (PointerWriteZero+1)=numLinesPerArea2+numSideLines1
        ]

ifnot/////////////////////////////////////
        [
rv PointerWriteZero=numSideLines1
rv (PointerWriteZero+1)=numLinesPerArea1
        ]
PointerLineWrite=PointerWriteZero+2/////////////////
PointerLineRead1=PointerReadZero1+2/////////////////
PointerLineRead2=PointerReadZero2+2///////////////// for i=1 to numSideLines1 do
        [
u=rv PointerLineRead1////////
if u ls 0 then u=-u
Moveblock(PointerLineWrite,PointerLineRead1,u)
PointerLineRead1=PointerLineRead1+u
PointerLineWrite=PointerLineWrite+u if PointerLineRead1 gr ThresholdR1 then ReadSector1()

if PointerLineWrite gr ThresholdW then WriteSector()

```
        ]
PointerRead1=PointerLineRead1
if LastAreaAnd Odd eq false do
        [
for i=numSideLines1+1 to numLinesPerArea1 do
                [
                        // add lines
//      let numwords2,numwords1,u=nil,nil,nil
numwords2=rv PointerLineRead2
u=numwords2
if u ls 0 then u=-u
MoveBlock(PointerLineWrite,PointerLineRead2,u)
PointerWrite=PointerLineWrite+u
PointerLineRead2=PointerLineRead2+u
numwords1=rv PointerLineRead1
v=numwords1
if v ls 0 then v=-v
PointerRead1=PointerLineRead1+1
if numwords1 ls 0 then
        [
numwords1=-numwords1
if ( numwords1 gr 1 ) & (u gr 2 ) then
                [
rv (PointerWrite-1)=((rv(PointerWrite-1)) & #177400)+((rv PointerRead1) & #377)
PointerRead1+PointerRead1+1
numwords1=numwords1-1
                ]
        ]
numwords1=numwords1-1
test numwords2 gr 0
ifso rv PointerLineWrite=numwords2+numwords1
ifnot rv PointerLineWrite=numwords2-numwords1
if numwords1 ne 0 then MoveBlock(PointerWrite,PointerRead1,numwords1)
                //end add lines PointerLineRead1=PointerLineRead1+v
w=rv PointerLineWrite
if w ls 0 then w=-w
PointerLineWrite=PointerLineWrite+w
```

```
if PointerLineRead1 gr ThresholdR1 then ReadSector1()

if PointerLineRead2 gr ThresholdR2 then ReadSector2()

if PointerLineWrite gr ThresholdW then WriteSector()
    ]
for i=numLinesPerArea1+1 to numLinesPerArea2+numSideLines1 do
    [
v=rv PointerLineRead2
if v ls 0 then v=-v Moveblock(PointerLineWrite,PointerLineRead2,v)
PointerLineRead2=PointerLineRead2+v
PointerLineWrite=PointerLineWrite+v if PointerLineRead2 gr ThresholdR2 then ReadSector2()

if PointerLineWrite gr ThresholdW then WriteSector()

]
  ]
if PointerLineWrite be PointerWriteZero then WriteSector()

]

and WriteFile() be
[
let k,ns1,ns2,na1,na2=0,0,0,0,0
DisplayPointer(15,#170017,#177777)
TotalLinesOut=0
WindowInA=WindowOutA
WindowInB=WindowOutB
FileSizeIn=FileSizeOut
FirstLineIn1=0
StartFileLineIn=0
FirstLineIn2=0
FirstLineOut=0
```

```
LineLengthIn=LineLengthOut
PointerLineWrite=PointerWriteZero
NumLinesOut=SectorSize/NewLengthPlusOneHalf
Count=NumLinesOut*NewLengthPlusOneHalf
ThresholdR1=PointerReadZero1+SectorSize-LineLengthIn
ThresholdR2=PointerReadZero2+SectorSize-LineLengthIn
ThresholdW=PointerWriteZero+(NumLinesOut-1)*NewLengthPlusOneHalf
EndWrite=false
        [
ReadSector1()
ns1=rv PointerReadZero1
na1=rv (PointerReadZero1+1)
PointerLineRead1=PointerReadZero1+2 if k ne 0 do
            [
AddFinishLine1(na2-ns2)
FirstLineIn2=StartFileLineIn
            ]

FinishLine1(ns1+ns2-na2)

k=k+1
if k eq NumAreas then
            [ if PointerLineWrite ne PointerWriteZero do WriteLines()
return
            ]
ReadSector2()
ns2=rv PointerReadZero2
na2=rv (pointerReadZero2+1)
PointerLineRead2=PointerReadZero2+2

AddFinishLine2(na1-ns1)

FinishLine2(ns1+ns2-na1)

StartFileLineIn=StartFileLineIn+FileSizeIn
```

FirstLineIn1=StartFileLineIn k=k+1 if k eq NumAreas then
        [ if PointerLineWrite be PointerWriteZero then WriteLines()
return

]
    ] repeat
]

and FinishLine1(m) be
[
let u=nil
for i=1 to m do
    [
u=rv PointerLineRead1
if u ls - then u=-u
NumWords=(rv PointerLineRead1)-2
if NumWords ls 0 then NumWords=NumWords-4
NumZeroes=rv (PointerLineRead1+1)
PointerRead1=PointerLineRead1+2
if NumZeroes gr 0 then Setblock(PointerLineWrite,-1,NumZeroes)
PointerWrite=PointerLineWrite+NumZeroes
if NumWords gr 0 then Moveblock(PointerWrite,PointerRead1,NumWords)
PointerWrite=PointerWrite+NumWords
NumZeroes=NewLengthPlusOneHalf-NumZeroes-NumWords
if NumZeroes gr 0 then Setblock(PointerWrite,-1,NumZeroes)

PointerLineWrite=PointerLineWrite+NewLengthPlusOneHalf

PointerLineRead1=PointerLineRead1+u if PointerLineRead1 gr ThresholdR1 then ReadSector1()

if PointerLineWrite gr ThresholdW then WriteLines()

```
    ]
]

and FinishLine2(m) be
[
let u=nil
for i=1 to m do
    [
u=rv PointerLineRead2
if u ls 0 then u=-u NumWords=(rv PointerLineRead2)-2
if NumWords ls 0 then NumWords=-NumWords-4
NumZeroes=rv (PointerLineRead2+1)
PointerRead2=PointerLineRead2+2 if NumZeroes gr 0 then Setblock(PointerLineWrite,-1,NumZeroes)
PointerWrite=PointerLineWrite+NumZeroes
if NumWords gr 0 then Moveblock(PointerWrite,PointerRead2,NumWords)
PointerWrite=PointerWrite+NumWords
NumZeroes=NewLengthPlusOneHalf-NumZeroes-NumWords
if NumZeroes gr 0 then SetBlock (PointerWrite,-1,NumZeroes)

PointerLineWrite=PointerLineWrite+NewLengthPlusOneHalf

PointerLineRead2=PointerLineRead2+u if PointerLineRead2 gr ThresholdR2 then ReadSector2()

if PointerLineWrite gr ThresholdW then WriteLines()
    ]
]

and AddFinishLine1(m) be
[
let u,v,w=nil,nil,nil
for i=1 to m do
```

```
[
u=rv PointerLineRead1
if u ls 0 then u=-u

NumWords=(rv PointerLineRead1)-2
if NumWords ls 0 then NumWords=-NumWords-4
NumZeroes=rv (PointerLineRead1+1)
PointerRead1=PointerLineRead1+2 if NumZeroes gr 0 then SetBlock(PointerLineWrite,-1,NumZeroes)
PointerWrite=PointerLineWrite+NumZeroes
if NumWords gr 0 then Moveblock(PointerWrite,PointerRead1,NumWords)
PointerLineRead1=PointerLineRead1+u
PointerWrite=PointerWrite+NumWords v=rv PointerLineRead2
if v ls 0 then v=-v
nw=rv PointerLineRead2
PointerRead2=PointerLineRead2+1
if nw ls 0 then
     [
nw=-nw
if ( nw gr 1 ) & ( NumWords ne 0 ) then
         [
rv (PointerWrite-1)=((rv (PointerWrite-1))& #177400)+((rv PointerRead2) & #377)
PointerRead2=PointerRead2+1
nw=nw-1
         ]
     ]
nw=nw-1
if nw ne 0 then Moveblock(PointerWrite,PointerRead2,nw)

PointerWrite=PointerWrite+nw
PointerLineRead2=PointerLineRead2+v
NumZeroes=NewLengthPlusOneHalf-nw-NumZeroes-NumWords
if NumZeroes gr 0 then Setblock(PointerWrite,-1,NumZeroes)

PointerLineWrite=PointerLineWrite+NewLengthPlusOneHalf
``` if PointerLineRead1 gr ThresholdR1 then ReadSector1()

if PointerLineRead2 gr ThresholdR2 then ReadSector2()

if PointerLineWrite gr ThresholdW then WriteLines()
    ]
]

and AddFinishLine2(m) be
[
let u,v,w=nil,nil,nil
for i=1 to m do
    [
v=rv PointerLineRead2
if v ls 0 then v=-v
NumWords=(rv PointerLineRead2)-2
if NumWords ls 0 then NumWords=-NumWords-4
NumZeroes=rv (PointerLineRead2+1)
PointerRead2=PointerLineRead2+2 if NumZeroes gr 0 then SetBlock(PointerLineWrite,-1,NumZeroes)
PointerWrite=PointerLineWrite+NumZeroes
if NumWords gr 0 then Moveblock(PointerWrite,PointerRead2,numWords)
PointerLineRead2=PointerLineRead2+v
PointerWrite=PointerWrite+NumWords
u=rv PointerLineRead1
if u ls 0 then u=-u nw=rv PointerLineRead1
PointerRead1-PointerLineRead1+1
if nw ls 0 then
        [
nw=-nw
if (nw gr 1 ) & ( NumWords ne 0 ) then
            [
rv (PointerWrite-1)=((rv (PointerWrite-1))& #177400)=((rv PointerRead1) & #377)
PointerRead=PointerRead1+1

```
nw=nw-1
            ]
        ]
nw=nw-1
if nw ne 0 then MoveBlock(PointerWrite,PointerRead1,nw)
PointerWrite=PointerWrite=nw
PointerLineRead1=PointerLineRoad1+u
NumZeroes=NewLengthPlusOneHalf-nw-NemZeroes-NumWords
if NumZeroes gr 0 then SetBlock(PointerWrite,-1,NumZeroes)

PointerLineWrite=PointerLineWrite+NewLengthPlusOneHalf if PointerLineRead1 gr ThresholdR1 then ReadSector1()

if PointerLineRead2 gr ThresholdR2 then ReadSector2()

if PointerLineWrite gr ThresholdW then WriteLines()
        ]
]

and ReadSector1() be
[
ReadAISScanLineS(WindowInA,FirstLineIn1,1,SectorSize,PointerReadZero1)
FirstLineIn1=FirstLineIn1+1
PointerLineRead1+PointerReadZero1
]

and ReadSector2() be
[
ReadAISScanLineS(WindowInB,FirstLineIn2,1,SectorSize,PointerReadZero2)
FirstLineIn2=FirstLineIn2+1
PointerLineRead2=PointerReadZero2
]

and WriteSector() be
[
```

WriteAISScanLineS(WindowOut,FirstLineOut,1,SectorSize,PointerWriteZero)

FirstLineOut=FirstLineOut+1

PointerLineWrite=PointerWriteZero

]

and WriteLines() be

[ if EndWrite eq true return

TotalLinesOut=TotalLinesOut+NumLinesOut if TotalLinesOut ge NewHeightPlusOne then

[

NumLinesOut=NewHeightPlusOne-(TotalLinesOut-NumLinesOut)

Count=NumLinesOut*NewLengthPlusOneHalf

EndWrite=true

]

test ChanSen2 ifnot

[

WriteAISScanLineS(NewWindow,FirstLineOut,NumLinesOut,Count,PointerWriteZero)

]

ifso

[ let Pointer=PointerWriteZero-NewLengthPlusOneHalf

ChangeSense(NumLinesOut-1,Pointer,NewLengthPlusOneHalf)

WriteAISScanLineS(NewWindow,FirstLineOut,NumLinesOut,Count,Pointer)

]

FirstLineOut=FirstLineOut+NumLinesOut

PointerLineWrite+PointerWriteZero

]

and ChangeSense(bxhgth,pointer,lengthplusonehalf) be

[ let PointerReadLocal,x,y=nil,nil,nil let PointerWriteLocal=pointer let PointerLineReadLocal=pointer+(lengthplusonehalf lshift 1)-1 for i=0 to bxhgth do

[

PointerReadLocal=PointerLineReadLocal for j=1 to lengthplusonehalf do

[ x=(rv PointerReadLocal) rshift 8 y=(rv PointerReadLocal) lshift 8 rv PointerWriteLocal=x+y

PointerWriteLocal=PointerWriteLocal+1

PointerReadLocal=PointerReadLocal-1

]

PointerLineReadLocal=PointerLineReadLocal+lengthplusonehalf

]

]

What is claimed is:

1. In a system having a memory for storing a digital image, the system including a processor with a memory buffer, the method of changing the orientation of the digital image into a given degree of rotation comprising the steps of:
- transferring a first portion of the digital image from the memory into the memory buffer,
- performing a first manipulation of the first portion of the image in the memory buffer,
- conveying the contents of the manipulated first portion of the image in the memory buffer back into the memory,
- transferring a second portion of the digital image from the memory to the memory buffer,
- performing a first manipulation of the second portion of the image in the buffer memory conveying the contents of the manipulated second portion of the image in the buffer memory back into the memory,
- repeating the above steps to perform a first manipulation of the digital image,
- repeating the process for performing a second manipulation of the image, and
- repeating the sequence until the total original digital image is manipulated into said given degree of rotation.

2. In a system having a memory disc storing an image comprising an array of pixels having a first orientation, the system including a computer with buffer memory, the method of rotating the image having the first orientation including the steps of
- sequentially conveying segments of the digital image into the buffer, rotating the segments and conveying the segments back to the disk memory into a first intermediate store, the rotated segments in the first intermediate being segments of n pixels where n is an integer,
- conveying portions of the rotated segments from the first intermediate store sequentially into the buffer memory and rotating the portions for transfer back to a second intermediate store, combining the rotated portions back into segments, the segments having 2 n pixels,
- repeating the above sequence and storing in a third intermediate store, each of the segments comprising 4 n pixels, and
- repeating the above steps until the original digital image has been completely rotated to a given angle.

* * * * *